US009831800B2

(12) United States Patent
Li et al.

(10) Patent No.: US 9,831,800 B2
(45) Date of Patent: Nov. 28, 2017

(54) SELF-BALANCED MODULATION AND MAGNETIC REBALANCING METHOD FOR PARALLEL MULTILEVEL INVERTERS

(71) Applicant: The Florida State University Research Foundation, Inc., Tallahassee, FL (US)

(72) Inventors: Hui Li, Tallahassee, FL (US); Yanjun Shi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 15/297,828

(22) Filed: Oct. 19, 2016

(65) Prior Publication Data

US 2017/0310240 A1    Oct. 26, 2017

Related U.S. Application Data

(60) Provisional application No. 62/325,803, filed on Apr. 21, 2016.

(51) Int. Cl.
*H02M 1/084* (2006.01)
*H02M 7/537* (2006.01)
*H02M 1/44* (2007.01)

(52) U.S. Cl.
CPC ............. *H02M 7/537* (2013.01); *H02M 1/44* (2013.01)

(58) Field of Classification Search
CPC . H02M 2001/0012; H02M 2001/0025; H02M 1/084; H02M 2007/4822; H02M 7/493; H02M 7/497; H02M 7/53873

(Continued)

(56) References Cited

U.S. PATENT DOCUMENTS 5,191,518 A * 3/1993 Recker ............... H02J 3/46
                                                    363/41
5,193,054 A * 3/1993 Galloway ............. H02J 4/00
                                                    307/82

(Continued)

FOREIGN PATENT DOCUMENTS

CA          2836335         10/2016
CN       103973145 A        8/2014

(Continued)

OTHER PUBLICATIONS

Translation of Chinese Patent No. CN103973145A (filing date Jan. 28, 2014) with a publication date of Aug. 6, 2014; Assignee: The Boeing Company.

(Continued)

*Primary Examiner* — Jeffrey Sterrett
(74) *Attorney, Agent, or Firm* — Molly L. Sauter; Smith & Hopen, P.A.

(57) ABSTRACT

A self-balanced modulation method and a closed-loop magnetic flux rebalancing control method for parallel multilevel inverters. The combination of the two methods provides for balancing of the magnetic flux of the inter-cell transformers (ICTs) of the parallel multilevel inverters without deteriorating the quality of the output voltage. In various embodiments a parallel multi-level inverter modulator is provide including a multi-channel comparator to generate a multiplexed digitized ideal waveform for a parallel multi-level inverter and a finite state machine (FSM) module coupled to the parallel multi-channel comparator, the FSM module to receive the multiplexed digitized ideal waveform and to generate a pulse width modulated gate-drive signal for each switching device of the parallel multi-level inverter. The system and method provides for optimization of the output voltage spectrum without influence the magnetic balancing.

20 Claims, 8 Drawing Sheets

(58) Field of Classification Search
USPC ...................................... 363/41, 71, 98, 132
See application file for complete search history.

(56) References Cited

U.S. PATENT DOCUMENTS

| | | | |
|---|---|---|---|
| 5,198,971 A * | 3/1993 | Recker | H02M 7/49 |
| | | | 363/41 |
| 5,650,708 A | 7/1997 | Sawada et al. | |
| 7,847,535 B2 | 12/2010 | Meynard et al. | |
| 8,374,009 B2 | 2/2013 | Feng et al. | |
| 8,885,371 B2 | 11/2014 | Markowski et al. | |
| 8,964,432 B2 | 2/2015 | Tang et al. | |
| 2012/0113695 A1* | 5/2012 | Chivite Zabalza | H02M 7/49 |
| | | | 363/71 |
| 2014/0003103 A1 | 1/2014 | Aaltio | |
| 2017/0033721 A1* | 2/2017 | Chai | H03K 17/127 |

FOREIGN PATENT DOCUMENTS

| | | |
|---|---|---|
| EP | 0469873 A2 | 7/1997 |
| WO | 2014194933 A1 | 12/2014 |

OTHER PUBLICATIONS

International Search Report and Written Opinion for PCT/US17/28592 (filling date: Apr. 20, 2017) dated Jul. 3, 2017; Applicant: The Florida State University Research Foundation, Inc.

* cited by examiner

SELF-BALANCED MODULATION AND MAGNETIC REBALANCING METHOD FOR PARALLEL MULTILEVEL INVERTERS

CROSS-REFERENCE TO RELATED APPLICATIONS

This application claims priority to U.S. Provisional Patent Application No. 62/325,803 filed on Apr. 21, 2016 and entitled, "A Self-Balanced Modulation and Magnetic Rebalancing Method for Parallel Multilevel Inverters", which is hereby incorporated by reference into this disclosure.

GOVERNMENT INTEREST STATEMENT

This invention was made with government support under DE-EE0006521 awarded by the Department of Energy. The government has certain rights in the invention.

FIELD OF THE INVENTION

This invention relates to a modulation method in combination with a control method. In particular, the invention relates to a self-balanced modulation method and a magnetic flux rebalancing control method for parallel multilevel inverters.

BACKGROUND OF THE INVENTION

A power inverter which can provide sinusoidal voltage or current is the key apparatus in the field of electrical machine drive and utility interface, such as in renewable energy generation systems and energy storage power conditioning systems. To achieve a higher power rating, each phase of the inverter may be constructed of paralleled phase legs. If two paralleled legs are connected to an output terminal by a magnetic coupling device, such as an "inter-phase transformer", or a "multi-winding autotransformer", or an "inter phase inductor", the output terminal of each phase will have a multilevel staircase waveform, which is closer to the desired sinusoidal waveform. Therefore, the inverter will require smaller magnetic components while still providing the benefit of higher dynamic response.

A magnetic coupling device between the paralleled legs of the inverter is commonly referred to as an "inter-cell transformer" (ICT). Additionally, an inverter that has multiple phase legs coupled with inter-cell transformers (ICTs) is commonly referred to as a "parallel multilevel inverter".

At least two categories of parallel multilevel inverters are known in the art. The first category is a parallel five-level (P5L) inverter, as shown in FIG. 1. And the second category is a parallel seven-level (P7L) inverter, as shown in FIG. 2.

Both P5L, and P7L inverters can be constructed with either NPC (Neutral Point Clamped) phase legs as shown in FIG. 3A or T-type phase legs, as shown in FIG. 3B. The conventional modulation method for P5L and P7L inverters is to interleave the carrier waveforms of each phase leg. As shown in FIG. 4, to interleave the carrier waveforms in a P5L inverter, one set of carriers in a phase leg is shifted by 180 degrees from the other set of carriers in the same phase. In a P7L, the shifted angle among three phase legs in the same phase is 120 degrees. The benefit of this carrier-interleaved modulation is that it can achieve multilevel outputs and magnetic flux balancing for ICTs, simultaneously. Under carrier-interleaved modulation, the volt-seconds applied to ICTs is naturally balanced within a switching period. This is an important feature because windings of an ICT are usually strongly coupled, if the volt-seconds applied to an ICT is unbalanced, the magnetic core of the ICT may quickly be saturated, resulting in an over current fault.

However, the problem with carrier-interleaved modulation is that it also limits the possibility of optimizing the output voltage spectrum. A better optimization of the output voltage spectrum can benefit the design of the inverter in various aspects including: output filter size reduction, ground leakage current suppression and EMI noise attenuation.

In a five-level (P5L) carrier based pulse-width-modulation (PWM), there are carrier disposition methods, namely PD (Phase Disposition), POD (Phase Opposition Disposition) and APOD (Alternate Phase Disposition). Each carrier disposition method generates a unique voltage spectrum. In engineering practice, each voltage spectrum provides advantages for specific applications. However, in a P5L PWM created by interleaving two sets of three-level (3L) carriers, which is commonly used in conventional P5L inverters, no matter how the carriers are disposed, the final output waveforms all have the same voltage spectrum.

Another related aspect is the closed-loop magnetic flux balancing issue for parallel multilevel inverters. Although volt-seconds applied on the ICT are balanced in the modulation, closed-loop balancing is still needed to deal with transient events and parameter unbalances. In the prior art, based on carrier interleaved modulation, closed-loop balancing is achieved by sampling the differential current within one phase and feeding it back into a circulating current control loop that controls the difference in modulation waveforms between phase legs within one phase. As this method doesn't control the exact switching time, the control bandwidth should be much lower than the switching frequency to avoid interfering with the output waveform. Therefore, this method is able to control static or slow rate unbalance. As such, the prior art method doesn't have effective control during fast dynamics. As a result, additional design margin has to be reserved for the ICTs.

Accordingly, what is needed in the art is a modulation method for parallel multilevel inverters that allows optimization of the output voltage spectrum while still maintaining balanced volt-seconds applied on the inter-cell transformers. It is also important that the modulation method provide access to fast magnetic flux rebalancing control.

SUMMARY OF THE INVENTION

In various embodiments, the present invention provides a finite state machine (FSM) based modulation method for parallel multi-level inverters. In the present invention, a modulation waveform is fed into a comparator to compare with carrier waveforms. A digitized ideal waveform is then generated and the digitized ideal waveform is then fed into a finite state machine (FSM) module to generate a switching pattern for each switch of the parallel multi-level inverter.

In the present invention, the generation of the digitized ideal waveform is not topology-related, and as such, any carrier based pulse-width modulation (PWM) is allowed, including, but not limited to, PD (Phase Disposition), POD (Phase Opposition Disposition) and APOD (Alternate Phase Disposition) and interleaved.

In one embodiment, the present invention provides a parallel multi-level inverter modulator which includes, a multi-channel comparator to generate a multiplexed digitized ideal waveform for a parallel multi-level inverter and a finite state machine (FSM) module coupled to the parallel multi-channel comparator, the FSM module to receive the multiplexed digitized ideal waveform and to generate a pulse width modulated gate-drive signal for each switching device of the parallel multi-level inverter. The multi-channel comparator may further include, a pre-processing module to receive a reference waveform and to generate a plurality of modified reference waveforms, a plurality of comparators coupled to the pre-processing module, each of the plurality of comparators to receive one of the plurality of modified reference waveforms, to compare the modified reference waveform to a triangular or saw tooth waveform and to generate an output signal and a level encoder coupled to the plurality of comparators, the level encoder to receive the output signal from each of the comparators and to generate the multiplexed digitized ideal waveform comprising an instantaneous level number for each level of the parallel multi-level inverter.

The present invention additionally includes a magnetic balancing method that is incorporated into the state transaction rules of the FSM. The present invention includes, a closed-loop rebalancing control module coupled to the FSM module, wherein the closed-loop rebalancing control module includes at least one differential current sensor for measuring a differential current between two phase legs of the parallel multi-level inverter and circuitry for adjusting a ratio between opposite switching state pairs of the two phase legs of the parallel multi-level inverter based upon the differential current between the two phase legs of the parallel multi-level inverter.

In an additional embodiment, the present invention provides a modulation system including a reference waveform generator and a parallel multi-level inverter modulator coupled to the reference waveform generator. The modulator additionally includes a multi-channel comparator to generate a multiplexed digitized ideal waveform for a parallel multi-level inverter and a finite state machine (FSM) module coupled to the parallel multi-channel comparator, the FSM module to receive the multiplexed digitized ideal waveform and to generate a pulse width modulated gate-drive signal for each switching device of the parallel multi-level inverter. The modulation system may also include a closed-loop rebalancing control module coupled to the FSM module.

In another embodiment, the present invention provides for a modulation method for a parallel multilevel inverter, which includes, receiving a reference waveform at a multi-channel comparator of a parallel multi-level inverter modulator, generating a multiplexed digitized ideal waveform at the multi-channel comparator for each level of a parallel multi-level inverter associated with the parallel multi-level inverter modulator, receiving the multiplexed digitized ideal waveform at a finite state machine (FSM) module of the parallel multi-level inverter modulator and generating a pulse width modulated gate-drive signal for each switching device of the parallel inverter.

To rebalancing the magnetic flux of the inverter; the method may further include, measuring a differential current between two phase legs of the parallel multi-level inverter adjusting a ratio between opposite switching state pairs of the two phase legs of the parallel multi-level inverter based upon the differential current between the two phase legs of the parallel multi-level inverter to rebalance a magnetic flux of the parallel multi-level inverter. As such, the magnetic flux rebalancing method is realized by utilizing redundant switching states in the FSM. The redundant switching states are the most effective states to rebalance magnetic flux, therefore they can always balance the magnetic flux in less than half of the switching period. Also because these two switching states are redundant states, using them will not influence the output voltage waveform.

The present invention can be implemented to minimize ground leakage current or minimize the requirement for ground leakage current choke, to decrease the peak of common-mode voltage, to decrease the size or weight of common-mode filters, to decrease the size or weight of differential mode filters, to decrease the size or weight of inter-cell transformers (ICTs) and to decrease power loss on the magnetic components. It should be noted that above improvements need not be achieved simultaneously.

As such, the various embodiments of the present invention provide an improved modulation method for parallel multilevel inverters that allows for optimization of the output voltage spectrum while still maintaining balanced volt-seconds applied on the inter-cell transformers. The modulation method provide also provides for a fast magnetic flux rebalancing control.

DETAILED DESCRIPTION OF THE INVENTION

In various embodiments, the present invention provides a method for self-balanced modulation and a closed-loop magnetic flux rebalancing control method for parallel multilevel inverters, including, but not limited to, parallel five-level (P5L) inverters and parallel seven-level (P7L) inverters. In combination, the methods provided by the present invention can guarantee that the magnetic flux of each of the inter-cell transformers (ICTs) in the parallel multilevel inverters are always balanced, without deteriorating the output voltage quality. More importantly, the present invention also allows optimization of the output voltage spectrum, which cannot be achieved using conventional methods currently known in the art, without altering the magnetic balancing.

Figure 5:
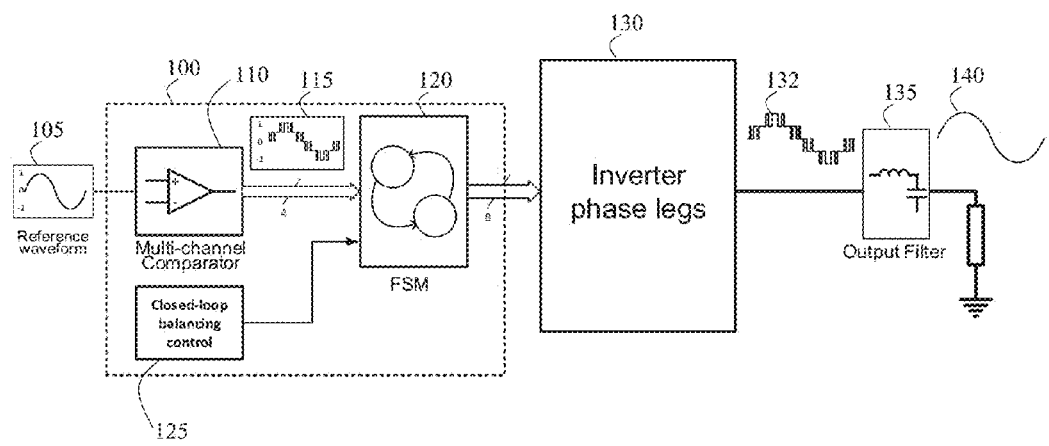
FIG. 5 is a block diagram illustrating the structure of the parallel multi-phase inverter modulation system, in accordance with an embodiment of the present invention.

1. An exemplary embodiment of the present invention is shown with reference to FIG. 5. As shown in FIG. 5, the parallel multi-level inverter modulator 100 of the present invention includes a multi-channel comparator 110 and a finite state machine (FSM) module 120. The multi-channel comparator 110 is coupled a reference waveform generator 105. The multi-channel comparator 110 receives a reference waveform from the reference waveform generator 105 and the multi-channel comparator 110 includes circuitry and/or a software implemented algorithm to generate a multiplexed digitized ideal waveform 115 that is to appear at the output 132 of the inverter phase legs 130 coupled to the parallel multi-level inverter modulator 100. The multiplexed digitized ideal waveform 115 generated by the multi-channel comparator 110 is provided to the FSM module 120 of the parallel multi-level inverter modulator 100 and the outputs of the FSM module 120 are gate-drive signals for switches of one phase of the inverter phase legs 130. The FSM 120 comprises circuitry, and/or a software implemented algorithm, and memory for performing a predetermined logic operation on the multiplexed digitized ideal waveform to generate a pulse width modulated gate-drive signal for each switching device of the parallel multi-level inverter. The output waveform 132 of the inverter phase legs 130 is then filtered by an output filter 135 to provide a filtered waveform 140.

Figure 1:
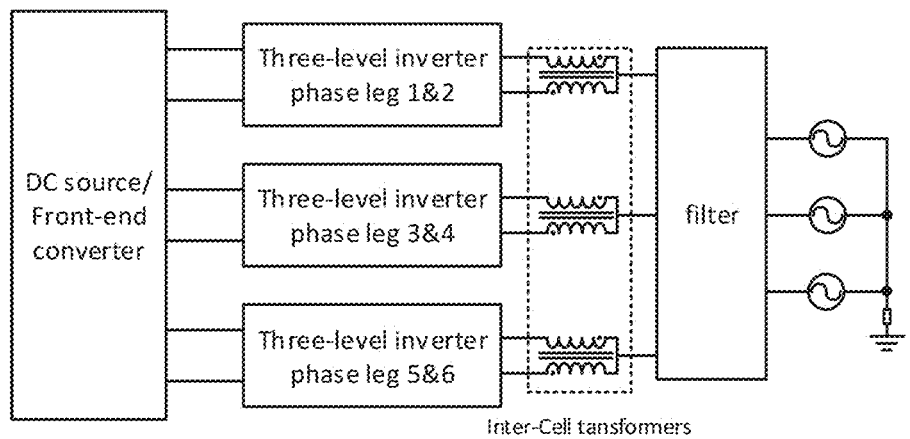
FIG. 1 is a circuit schematic of a three-phase P5L inverter known in the prior art consisting of three two-winding inter-cell transformers, wherein each inter-cell transformer is fed with two phase legs.
Figure 2:
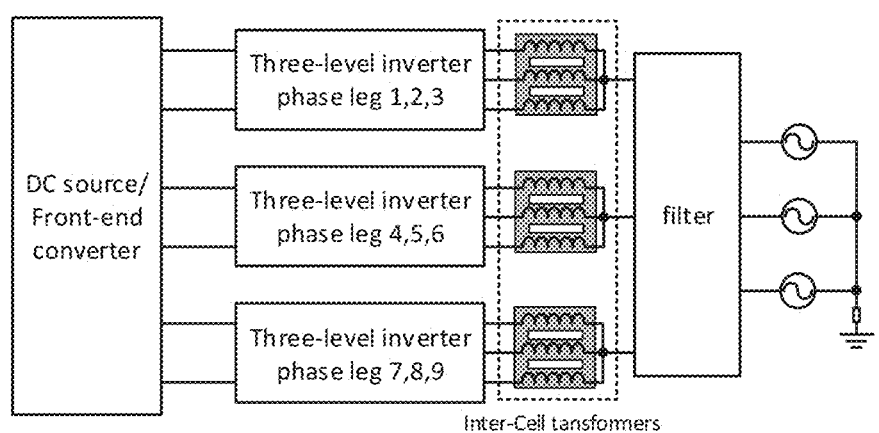
FIG. 2 is a circuit schematic of a three-phase P7L inverter known in the prior art consisting of three three-winding inter-cell transformers, wherein each inter-cell transformer is fed with three phase legs.
Figure 3A:
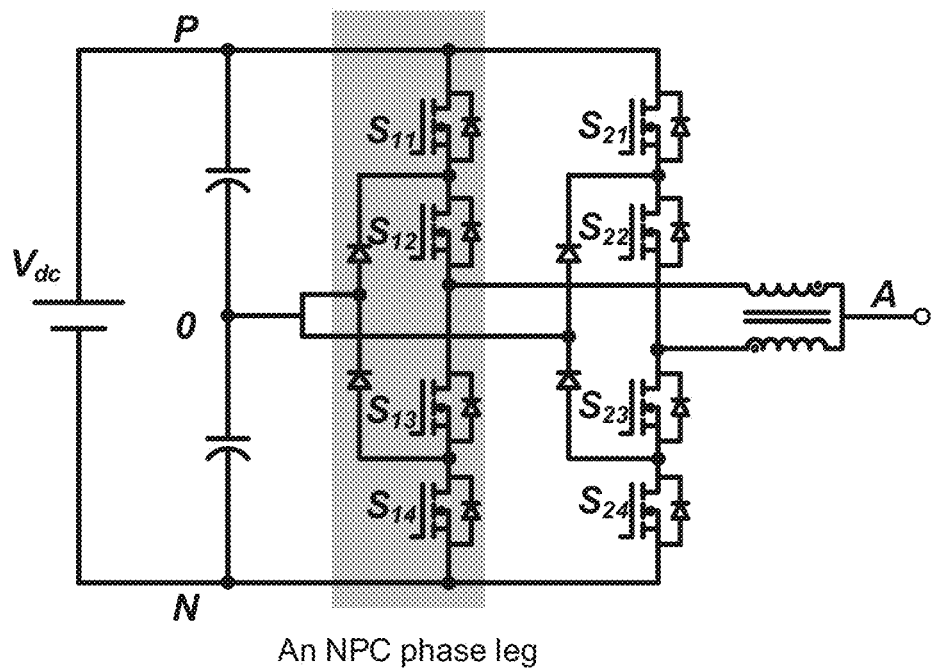
FIG. 3A is a circuit schematic of one phase of a P5L inverter known in the prior art having NPC phase legs.
Figure 3B:
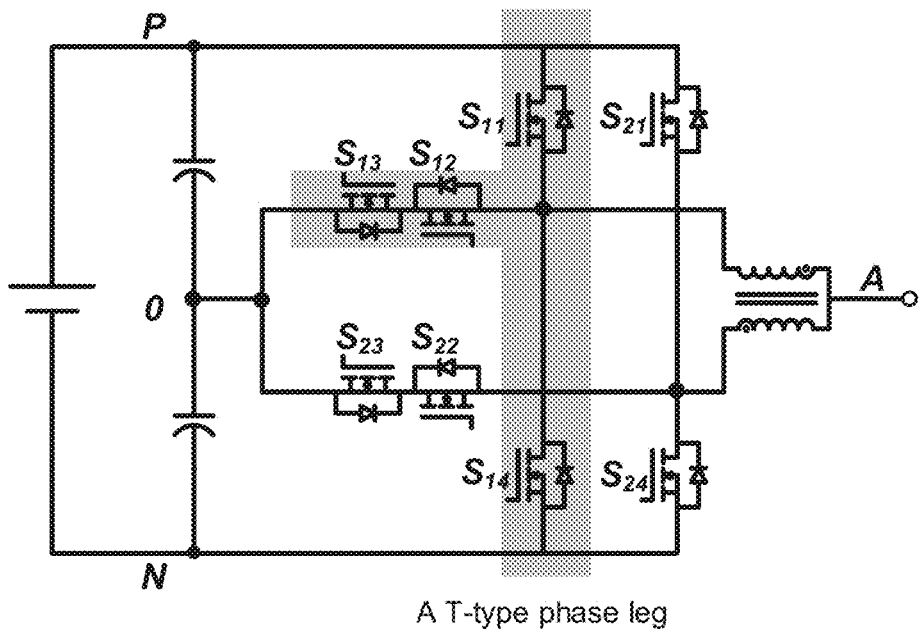
FIG. 3B is a circuit schematic of one phase of a P5L inverter known in the prior art having T-type phase legs.
Figure 4:
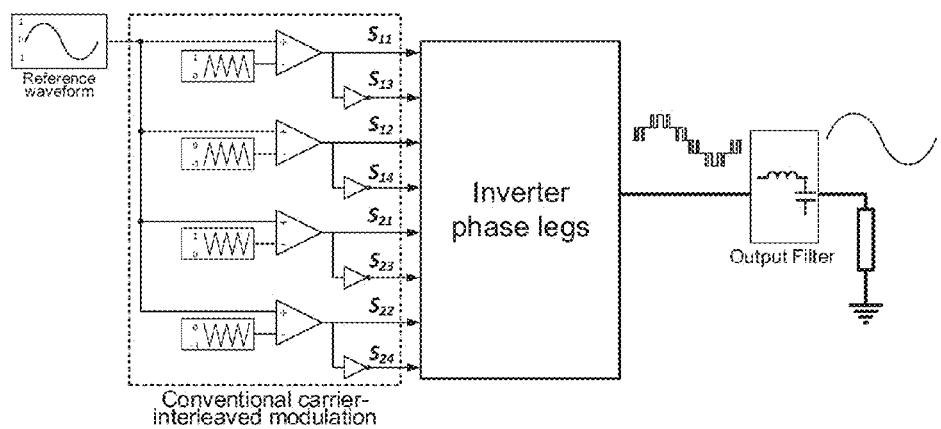
FIG. 4 is a block diagram illustrating the conventional carrier-interleaved modulation known in the prior art.

In various embodiments, the switches of the inverter phase legs 130 that are controlled by the gate-drive signals generated by the FSM module 120 may be comprised of transistor elements as shown in FIG. 3A and FIG. 3B, and as is commonly known in the art. The inverter phase legs 130 may additionally include inter-cell transformers (ICTs), as shown with reference to FIG. 1 and FIG. 2, and as is commonly known in the art.

Figure 6:
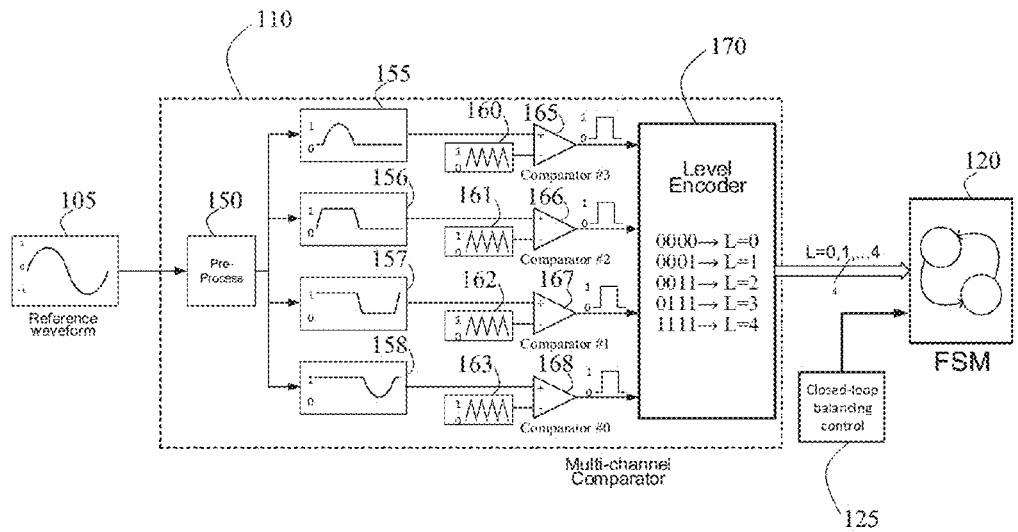
FIG. 6 is a block diagram illustrating the multi-channel comparator of the parallel multi-phase inverter modulation system, in accordance with an embodiment of the present invention.

An exemplary embodiment of the multi-channel comparator 110 of the parallel multi-level inverter modulator 100 is shown with reference to FIG. 6. In this exemplary embodiment, the parallel multi-level inverter is a P5L inverter, however this is not intended to be limiting and the parallel multi-level inverter modulator 100 of the present invention may be implemented in various other inventor topologies known in the art. In this exemplary embodiment, the multi-channel comparator 110 includes a pre-processing module 150, a plurality of comparators 165, 166, 167, 168 coupled to an output of the pre-processing module 150 and a level encoder 170 coupled to the outputs of each of the plurality of comparators 165, 166, 167, 168.

As shown in FIG. 6, the reference waveform generated by the reference waveform generator 105 is first fed into the pre-processing module 150 of the multi-channel comparator 110. At the pre-processing module 150, the reference waveform is modified and rearranged into four modified reference waveforms 155, 156, 157, 158, The function of the pre-processing module 150 is to modify the reference waveform 105 to be within a range that can be processed by the level encoder 170 of the multi-channel comparators 165, 166, 167, 168, while maintaining an acceptable level of accuracy in the waveform. In a particular embodiment, the reference waveform may be a sinusoidal reference waveform having a range of $\{-1, 1\}$ and each of the four modified reference waveforms 155, 156, 157, 158 generated by the pre-processing module 150 represent a different portion of the reference waveform that has been multiplied by two and biased to results in an output signal in the range of $\{0, 1\}$.

Each of the modified reference waveforms 155, 156, 157, 158 is then fed into one of a plurality of comparator circuits 165, 166, 167, 168 of the multi-channel comparator 110. Each of the four comparator 165, 166, 167, 168 compares one of the modified reference waveforms 155, 156, 157, 158 with a triangle or saw tooth carrier waveform 160, 161, 162, 163. The results of the comparisons performed by the comparator circuits 165, 166, 167, 168 are then fed into a level encoder 170 to be coded into an instantaneous level number, "L". For P5L inverters, $L \in \{0,1,2,3,4\}$.

In accordance with the present invention, the modulation is separated into two stages, wherein the first stage generates an ideal or desired multilevel waveform that should appear at the output terminal of the parallel multi-level inverter and the second stage address the circuit related constraints. In the present invention, by modifying the alignment method of the four carrier waveform 160, 161, 162, 163, the output voltage spectrum of the parallel multi-level inverter can be modified without influencing the fundamental output waveform of the parallel multi-level inverter.

An embodiment of the multi-channel comparator of a parallel multi-level modulator 100 for P7L inverters can be realized utilizing the same elements and methods as previously described with reference to FIG. 6, by changing the number of channels for from four to six. As such, the pre-processing module would generate six modified reference waveforms and the multi-channel comparator would include six comparators for comparing the six modified reference waveforms to a triangular waveform, as previously described.

In additional to the multi-channel comparator 110, the parallel multi-level modulator 100 of the present further comprises a FSM module 120 coupled to an output of the level encoder 170 of the multi-channel comparator 110. An exemplary embodiment of the FSM module 120 for P5L inverters is shown with reference to FIG. 7.

Figure 7:
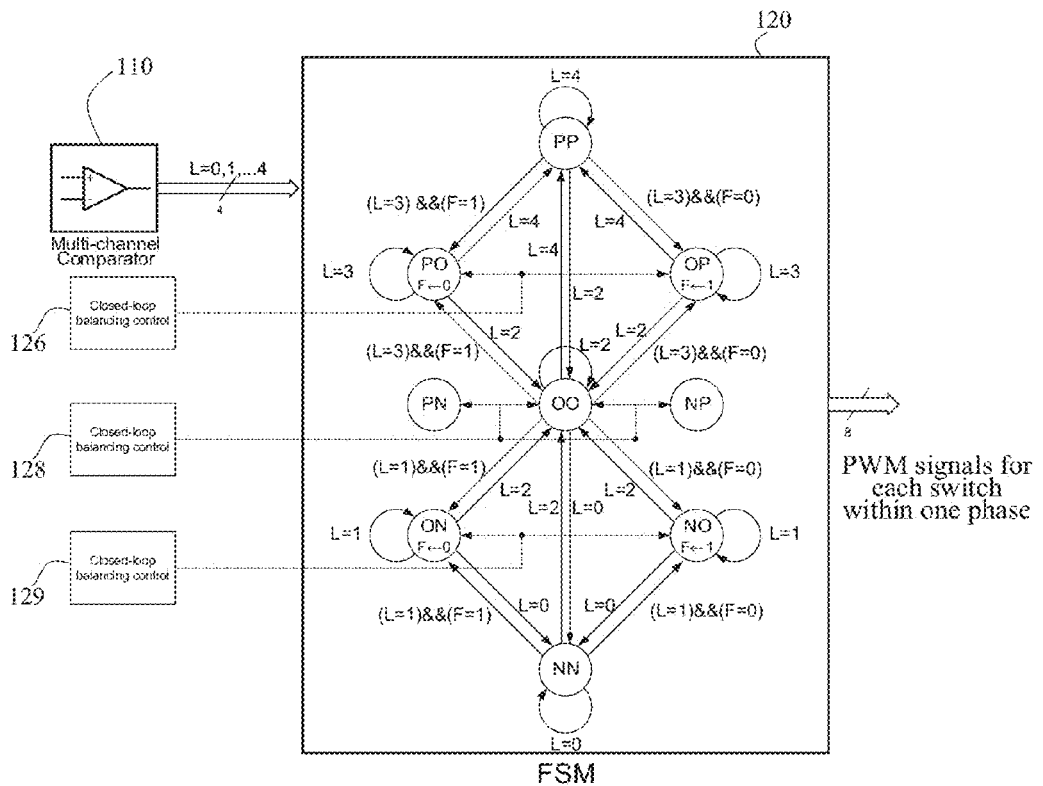
FIG. 7 is a block diagram illustrating the finite state machine (FSM) or P5L inverters, in accordance with an embodiment of the present invention.

In FIG. 7, letter "P" "O", and "N" standard for "positive", "zero", and "negative". The letter designations represent the switching state of one phase leg of the inverter, which is achieved by a combination of the switching state of each semiconductor device within a phase leg, as shown in Table I. Two phase legs of one phase generate 9 switching states which form 5 levels output. The switching states of each phase and their effects on the output voltage as well as voltage applied to the ICT of the inverter legs are listed in Table II, where L0 to L4 are the number of the five levels. Because the 9 states of a phase only have 5 different output levels, at each level, there may be redundant switching states. The numbers of redundant switching states are also listed in Table II, next to the corresponding level number. As such, at L1, L2, and L3, there are redundant switching states that have the same effect on the output voltage but an opposite effect on the ICT voltage. By evenly distributing the opposite switching state pairs (PO-OP or ON-NO) at L1 and L3, the volt-seconds applied on the ICT is balanced. Therefore at L1 and L3, the magnetic flux is balanced. At L0 or L4, the switching states have no influence on the ICT. At L2, by excluding PN and NP from normal operation, the only remaining switching state doesn't have an influence on ICT. Therefore, in accordance with the FSM modulation provided by FSM module 120 of the parallel multi-level modulator 100, the ICT magnetic flux is naturally balanced.

TABLE I

Switching States of Each Phase

| | $S_{x1}$ | $S_{x2}$ | $S_{x3}$ | $S_{x4}$ |
|---|---|---|---|---|
| P | 1 | 1 | 0 | 0 |
| O | 0 | 1 | 1 | 0 |
| N | 0 | 0 | 1 | 1 |

TABLE II

Switching States of Each Phase (Two Phase Legs)

| | $S_{x1}S_{x2}$ | Output voltage | ICT voltage |
|---|---|---|---|
| L4 (1) | PP | $V_{dc}$ | 0 |
| L3 (2) | PO | 0.5 $V_{dc}$ | $V_{dc}$ |
| | OP | | $-V_{dc}$ |
| L2 (3) | PN | 0 | 2 $V_{dc}$ |
| | OO | | 0 |
| | NP | | $-2 V_{dc}$ |
| L1 (2) | ON | $-0.5 V_{dc}$ | $V_{dc}$ |
| | NO | | $-V_{dc}$ |
| L0 (1) | NN | $-V_{dc}$ | 0 |

However, although the FSM modulation in accordance with the present invention naturally balances the volt-seconds at the ICT, under some non-ideal circumstances, including unbalanced ICT/phase leg parameters and transient voltage change, there is still the possibility that the magnetic flux of the ICT may become unbalanced. Accordingly, the present invention may include a closed-loop balancing control module 125 coupled to the FSM module 120 for balancing the magnetic flux of the ICT of the inverter phase legs 130 should the magnetic flux become unbalanced at any time.

Figure 8:
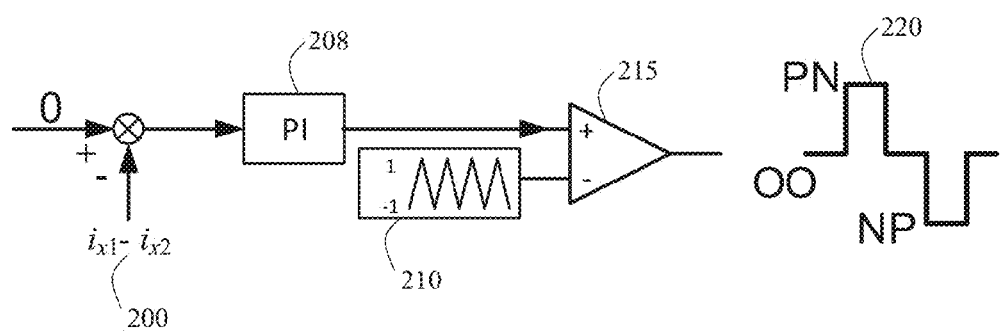
FIG. 8 is a block diagram illustrating an embodiment of the closed loop magnetic flux rebalancing control for P5L inverter in accordance with an embodiment of the present invention.

An exemplary embodiment of the closed-loop magnetic rebalancing control module 125 is illustrated with reference to FIG. 7 and FIG. 8. The mechanism of the closed-loop magnetic rebalancing control module 125 can be explained with reference to FIG. 7. As shown in FIG. 7, in the case of a P5L inverter, the closed-loop rebalancing control module 125 includes three closed-loop rebalancing control modules 126, 1.28, 129. The first closed-loop rebalancing control module 129 is coupled to the FSM module 120 at L1, the second closed-loop rebalancing control module 128 is coupled to the FSM module 120 at L2 and the third closed-loop rebalancing control module 126 is coupled to the FSM module 120 at L3. As shown, by adjusting the ratio of the duration of PO-OP and ON-NO pairs at L3 or L1, the magnetic flux of the ICT can be increased or decreased. Under a balanced condition, the ratio of the duration of PO to the duration of OP is 1. If the averaged magnetic flux of ICT is positive, then the ratio of the duration of PO to the duration of OP should be reduced to a ratio of less than 1, if the averaged magnetic flux of ICT is negative, then the ratio of the duration of PO to the duration of OP should be increased to a ratio greater than 1.

At L2, the two unused redundant states, PN and NP, are used to perform a more powerful rebalancing. When ICT magnetic flux is positively biased, by replacing OO state with NP state, the magnetic flux can be rebalanced within half of a switching cycle.

At L4 or L0, there is no redundant switching state which can be used for rebalancing, however, since at any time the inverter is always switching between two nearby levels, rebalancing at L1, L2, and L3 is sufficient to rebalance the magnetic flux when necessary.

In order to determine if rebalancing of the magnetic flux is necessary, the magnetic flux bias must first be measured. The detection of the magnetic flux bias can be achieved by sensing the differential current between two phase legs using a differential current sensor. As shown with reference to FIG. 8, the differential current 200 between two phase legs, as measured by the differential current sensor, is provided to a PI controller 205 to amplify the differential current measurement. The amplified differential current measurement is then compared to a triangle or saw tooth wave 210 at a comparator 215 to generate the adjustment 220 for the redundant state pairs.

Figure 9:
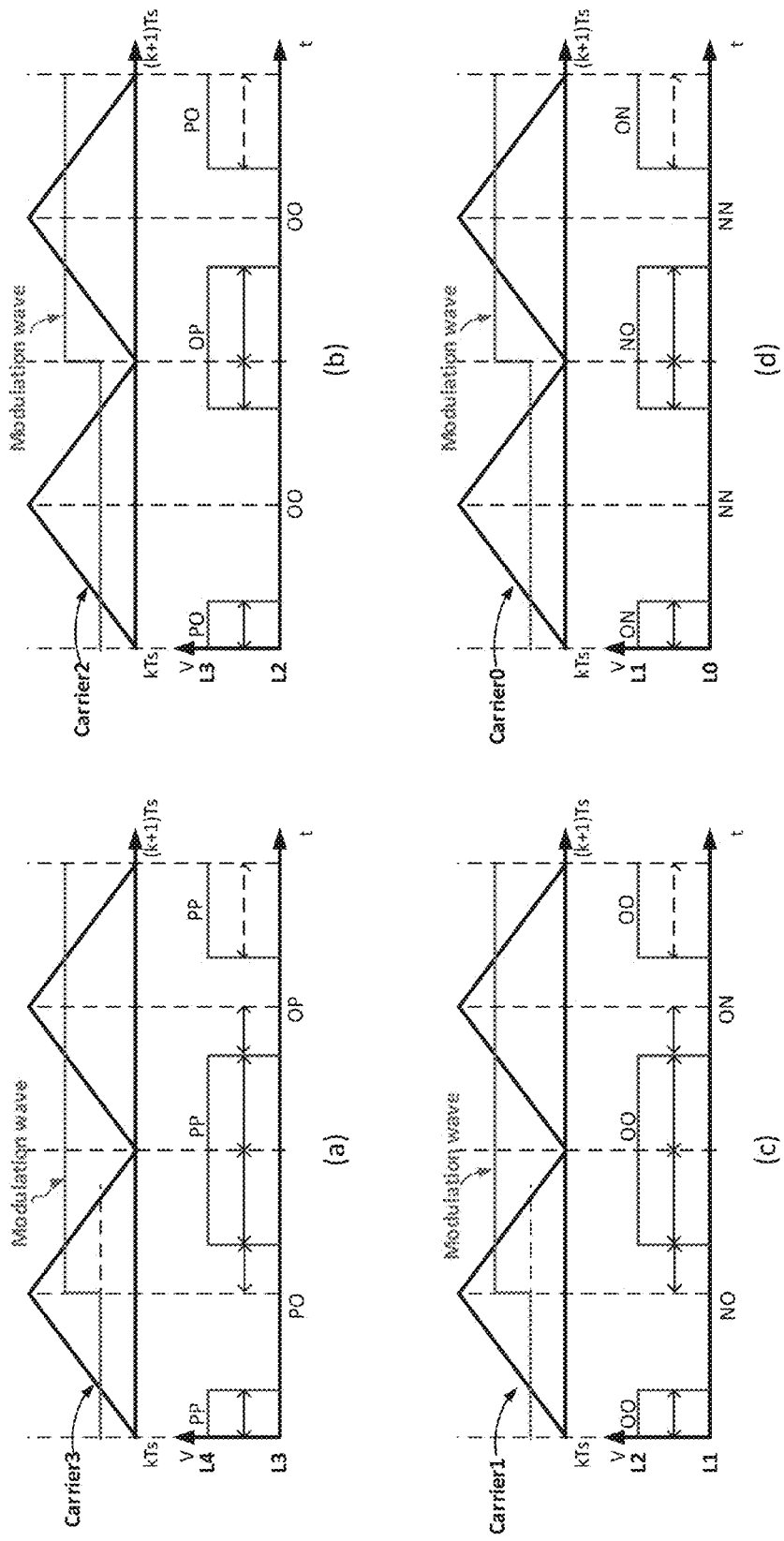
FIG. 9 is a diagram illustrating the update method for the modulation wave to achieve minimum magnetic flux fluctuation, in accordance with an embodiment of the present invention.

The update time of the modulation waveform will influence the fluctuation of the magnetic flux in ICT. To minimize the magnetic fluctuation, the method illustrated with reference to FIG. 9(a)-FIG. 9(d) is recommended. As shown in FIG. 9(d), between L0 and L1, the modulation waveform should be loaded into the plurality of comparators 165, 166, 167, 168 at the bottom of the carriers. At shown in FIG. 9(c), between L1 and L2, the modulation waveform should be loaded into the plurality of comparators 165, 166, 167, 168 at the peak of the carriers. As shown in FIG. 9(b), between L2 and L3, the modulation waveform should be loaded into the plurality of comparators 165, 166, 167, 168 at the bottom of the carriers and as shown in FIG. 9(a), between L3 and L4, the modulation waveform should be loaded into the plurality of comparators 165, 166, 167, 168 at the peak of the carriers.

Figure 10:
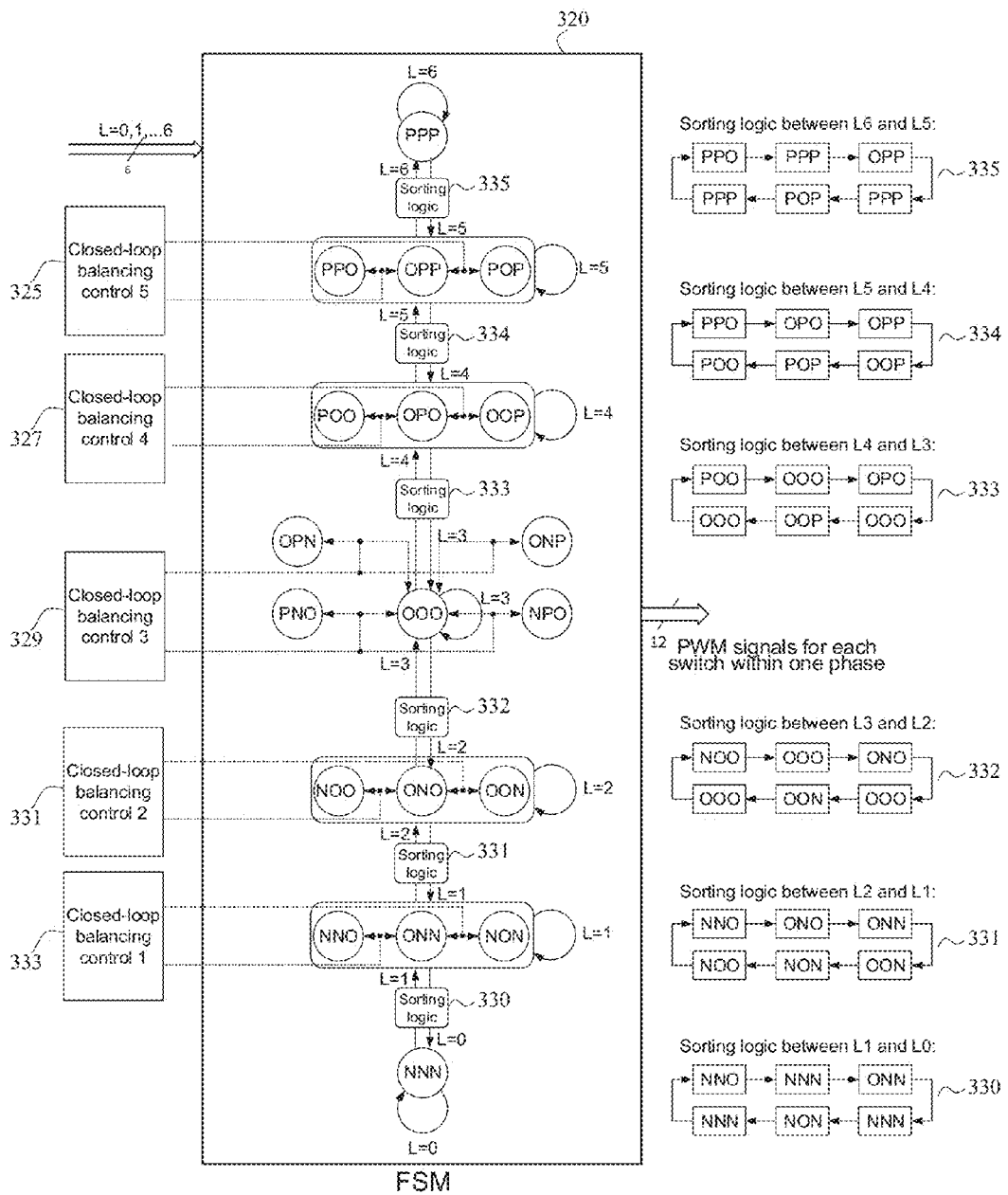
FIG. 10 is a block diagram illustrating the FSM for P7L inverters, in accordance with an embodiment of the present invention.

An embodiment of the FSM module 320 for P7L inverters is shown with reference to FIG. 10. In this embodiment, the closed-loop rebalancing control includes a first closed-loop re-balancing control module 333 coupled to the FSM module 320 at L1, a second closed-loop rebalancing control module 331 coupled to the FSM module 320 at L2, a third closed-loop rebalancing control module 329 is coupled to the FSM module 320 at L3, a fourth closed-loop rebalancing control module 327 coupled to the FSM module 320 at L4 and a fifth closed-loop rebalancing control module 325 coupled to the FSM module 320 at L5. In FIG. 10, the three letter states (for example "PPO") are standard references for the switching state of one phase which consists of three phase legs instead of two, as in the P5L embodiment of FIG. 7, In implementing the FSM module 320 in a P7L inverter solutions, entering and leaving each level requires specific sorting logic 330, 331, 332, 333, 334, 335, as shown in FIG. 10. The function of the sorting logic 330, 331, 332, 333, 334, 335 between the levels is to minimize the magnetic flux fluctuation of ICT.

Figure 11:
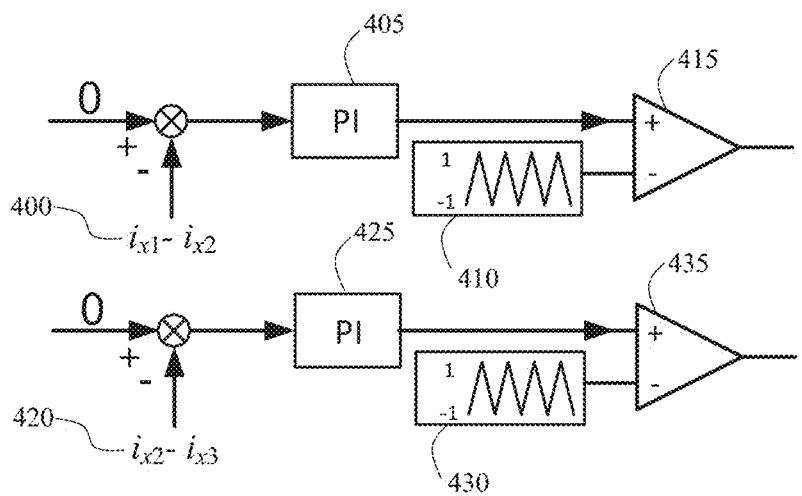
FIG. 11 is a block diagram illustrating the closed loop magnetic flux rebalancing control for P7L inverter, in accordance with an embodiment of the present invention.

An embodiment of the closed-loop magnetic flux rebalancing method performed by the closed-loop rebalancing control modules 325, 327, 329, 331, 333 is shown with reference to FIG. 11. As shown FIG. 11, due to the three windings in the ICT for P7L inverters, as shown in FIG. 2; two differential current sensors and two current control loops are needed for each level. A first differential current 400 between the first phase leg and the second phase leg, as measured by a first differential current sensor, is provided to a first PI controller 405 to amplify the differential current measurement. The amplified differential current measurement is then compared to a triangle or saw tooth wave 410 at a comparator 415 to generate a first adjustment for rebalancing of the magnetic flux. Additionally, a second differential current 420 between the second phase leg and the third phase leg, as measured by a second differential current sensor, is provided to a second PI controller 425 to amplify the differential current measurement. The amplified differential current measurement is then compared to a triangle or saw tooth wave 430 at a comparator 435 to generate the second adjustment for rebalancing of the magnetic flux.

In accordance with the various embodiments of the present invention, the parallel multi-level inverter modulator implements an improved modulation method which includes: (1) Separation of the need to generate multilevel output waveforms and the need for safely operating a particular topology (in this case, the need for magnetic balancing). Therefore, providing more freedom to optimize the output voltage spectrum; (2) Providing redundant switching states that can be used for fast closed-loop magnetic re-balancing without influencing the output voltage waveform.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette; a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Iii the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, microcontroller or general-purpose computer. The FPGA may be coded utilizing C, or any Hardware description languages (HDL), such as VHDL, Verilog HDL, or SystemC.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A parallel multi-level inverter modulator, the modulator comprising:
   a multi-channel comparator to generate a multiplexed digitized ideal waveform for a parallel multi-level inverter; and a finite state machine (FSM) module coupled to the parallel multi-channel comparator, the FSM module to receive the multiplexed digitized ideal waveform and to generate a pulse width modulated gate-drive signal for each switching device of the parallel multi-level inverter.

2. The modulator of claim 1, wherein the FSM module further comprises circuitry and memory for performing a predetermined logic operation on the multiplexed digitized ideal waveform to generate a pulse width modulated gate-drive signal for each switching device of the parallel multi-level inverter.

3. The modulator of claim 1, wherein the multi-channel comparator further comprises:
a pre-processing module to receive a reference waveform and to generate a plurality of modified reference waveforms;
a plurality of comparators coupled to the pre-processing module, each of the plurality of comparators to receive one of the plurality of modified reference waveforms, to compare the modified reference waveform to a carrier waveform and to generate an output signal; and
a level encoder coupled to the plurality of comparators, the level encoder to receive the output signal from each of the comparators and to generate the multiplexed digitized ideal waveform comprising an instantaneous level number for each level of the parallel multi-level inverter.

4. The modulator of claim 3, wherein each of the plurality of modified reference waveforms are generated from a different portion of the reference waveform.

5. The modulator of claim 1, further comprising:
a closed-loop rebalancing control module coupled to the FSM module.

6. The modulator of claim 5, wherein the closed-loop rebalancing control module further comprises a closed-loop rebalancing control module for each level the parallel multi-level inverter.

7. The modulator of claim 5, wherein the closed-loop rebalancing control module further comprises at least one differential current sensor for measuring a differential current between two phase legs of the parallel multi-level inverter.

8. The modulator of claim 7, wherein the closed-loop rebalancing control module further comprises circuitry for adjusting a ratio between opposite switching state pairs of the two phase legs of the parallel multi-level inverter based upon the differential current between the two phase legs of the parallel multi-level inverter.

9. A system comprising:
a reference waveform generator;
a parallel multi-level inverter modulator coupled to the reference waveform generator, the modulator comprising:
a multi-channel comparator to generate a multiplexed digitized ideal waveform for a parallel multi-level inverter;
a finite state machine (FSM) module coupled to the parallel multi-channel comparator, the FSM module to receive the multiplexed digitized ideal waveform and to generate a pulse width modulated gate-drive signal for each switching device of the parallel multi-level inverter; and
a plurality of inverter phase legs and inter-cell transformers (ICTs) coupled to the FSM module.

10. The system of claim 9, wherein the FSM module further comprises circuitry and memory for performing a predetermined logic operation on the multiplexed digitized ideal waveform to generate a pulse width modulated gate-drive signal for each switching device of the parallel multi-level inverter.

11. The system of claim 9, wherein the multi-channel comparator further comprises:
a pre-processing module to receive a reference waveform and to generate a plurality of modified reference waveforms;
a plurality of comparators coupled to the pre-processing module, each of the plurality of comparators to receive one of the plurality of modified reference waveforms, to compare the modified reference waveform to a carrier waveform and to generate an output signal; and
a level encoder coupled to the plurality of comparators, the level encoder to receive the output signal from each of the comparators and to generate the multiplexed digitized ideal waveform comprising an instantaneous level number for each level of the parallel multi-level inverter.

12. The system of claim 11, wherein each of the plurality of modified reference waveforms are generated from a different portion of the reference waveform.

13. The system of claim 9, further comprising:
a closed-loop rebalancing control module coupled to the FSM module.

14. The system of claim 13, wherein the closed-loop rebalancing control module further comprises a closed-loop rebalancing control module for each level of the parallel multi-level inverter.

15. The system of claim 13, wherein the closed-loop rebalancing control module further comprises at least one differential current sensor for measuring a differential current between two phase legs of the parallel multi-level inverter.

16. The system of claim 15, wherein the closed-loop rebalancing control module further comprises circuitry for adjusting a ratio between opposite switching state pairs of the two phase legs of the parallel multi-level inverter based upon the differential current between the two phase legs of the parallel multi-level inverter.

17. The system of claim 9, further comprising an output filter coupled to the plurality of inverter phase legs.

18. A modulation method for a parallel multilevel inverter, the method comprising:
receiving a reference waveform at a multi-channel comparator of a parallel multi-level inverter modulator;
generating a multiplexed digitized ideal waveform at the multi-channel comparator for each level of a parallel multi-level inverter associated with the parallel multi-level inverter modulator;
receiving the multiplexed digitized ideal waveform at a finite state machine (FSM) module of the parallel multi-level inverter modulator; and
generating a pulse width modulated gate-drive signal for each switching device of the parallel multi-level inverter.

19. The method of claim 18, further comprising:
measuring a differential current between two phase legs of the parallel multi-level inverter; and
adjusting a ratio between opposite switching state pairs of the two phase legs of the parallel multi-level inverter based upon the differential current between the two phase legs of the parallel multi-level inverter to re-balance a magnetic flux of the parallel multi-level inverter.

20. The method of claim 18, wherein generating a multiplexed digitized ideal waveform a the multi-channel comparator further comprises:
- pre-processing the reference waveform to generate a plurality of modified reference waveforms, wherein each of the plurality of modified reference waveforms are generated from a different portion of the sinusoidal reference waveform;
- comparing each one of the plurality of modified reference waveforms to carrier waveform to generate an output signal; and
- level encoding the output signal to generate the multiplexed digitized ideal waveform comprising an instantaneous level number for each level of the parallel multi-level inverter.

* * * * *